United States Patent [19]

Morozumi et al.

[11] Patent Number: 5,122,191

[45] Date of Patent: Jun. 16, 1992

[54] ADMIXTURE AND CEMENT COMPOSITION USING SAME

[75] Inventors: Masahiro Morozumi, Tondabayashi; Yasuhiko Yoshioka, Mitaka; Takashi Iwashimizu, Sakai; Masahiro Yamashita, Izumisano; Kenji Hayashi, Shijonawate; Yukihiro Tanigawa; Hisao Kitano, both of Osaka; Fumio Tanimoto, Kyoto, all of Japan

[73] Assignees: Takenaka Corporation; Hayashi Kasei Co., Ltd., both of Osaka, Japan

[21] Appl. No.: 655,866

[22] Filed: Feb. 15, 1991

[30] Foreign Application Priority Data

Feb. 22, 1990 [JP] Japan .................. 2-41677
Sep. 7, 1990 [JP] Japan .................. 2-238689

[51] Int. Cl.$^5$ .............................. C04B 14/10
[52] U.S. Cl. .................... 106/811; 106/718; 501/150
[58] Field of Search .................. 106/718, 811; 501/150

[56] References Cited

U.S. PATENT DOCUMENTS

| | | | |
|---|---|---|---|
| 3,014,836 | 12/1961 | Proctor, Jr. ............... | 501/150 |
| 3,309,214 | 3/1967 | Podschus et al. ........... | 501/150 |
| 3,586,523 | 6/1971 | Fanselow et al. ........... | 501/150 |
| 4,246,039 | 1/1981 | Mixon, Jr. ................. | 501/150 |
| 4,299,807 | 11/1981 | Angel et al. ............... | 501/150 |
| 4,381,948 | 5/1983 | McConnell et al. ......... | 501/145 |
| 4,419,228 | 12/1983 | Cook et al. ................ | 501/150 |
| 4,793,861 | 12/1988 | Sohm ........................ | 106/711 |

*Primary Examiner*—Mark L. Bell
*Assistant Examiner*—Anthony J. Green
*Attorney, Agent, or Firm*—Armstrong, Nikaido, Marmelstein, Kubovcik & Murray

[57] ABSTRACT

An admixture for cement compositions is prepared by calcining at 630° to 870° C. at least one substance selected from the group consisting of natural kaolin, halloysite and synthetic kaolin, effecting classification so that amorphous portions of alumina/silica having a mixing ratio of 0.5 to 1.3 form main components, with all particles having diameters up to 8 μm and an average diameter of 0.5 to 2 μm, and a specific gravity ranging from 2.45 to 2.55. This admixture is used to produce a cement composition such as mortar or concrete, which realizes excellent fluidity to promote workability, and a high strength structure.

3 Claims, 12 Drawing Sheets

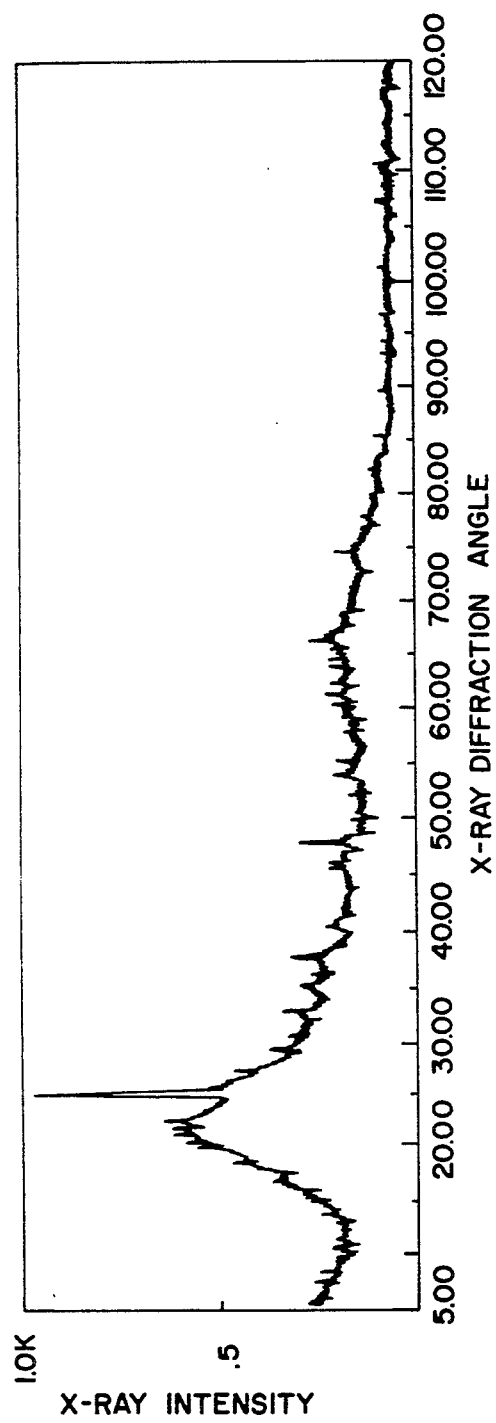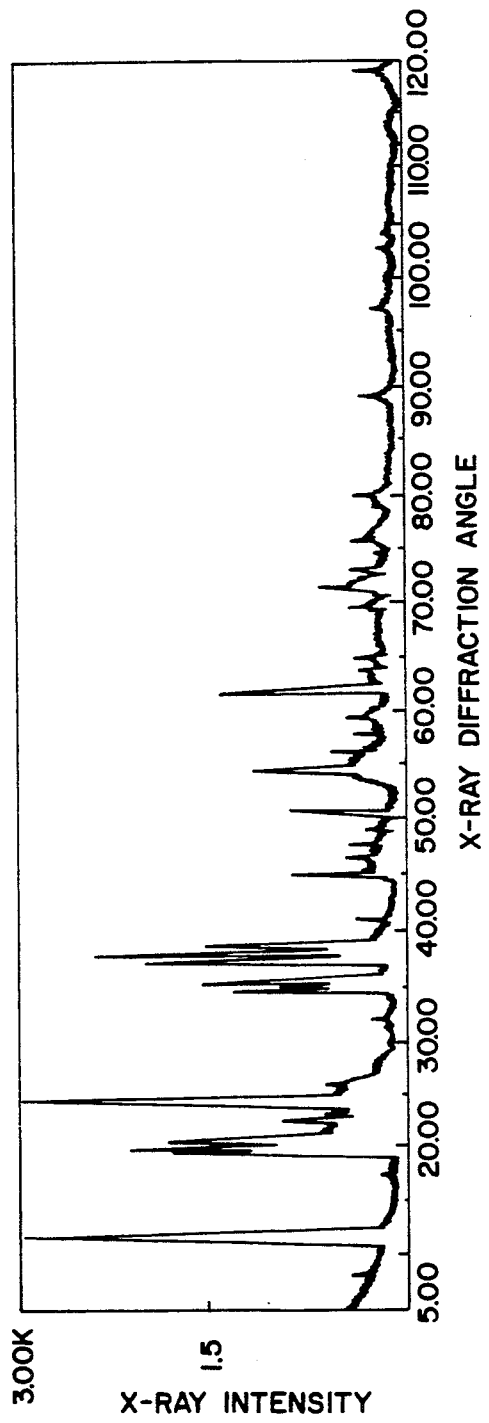
FIG.1(a)
FIG.1(b)

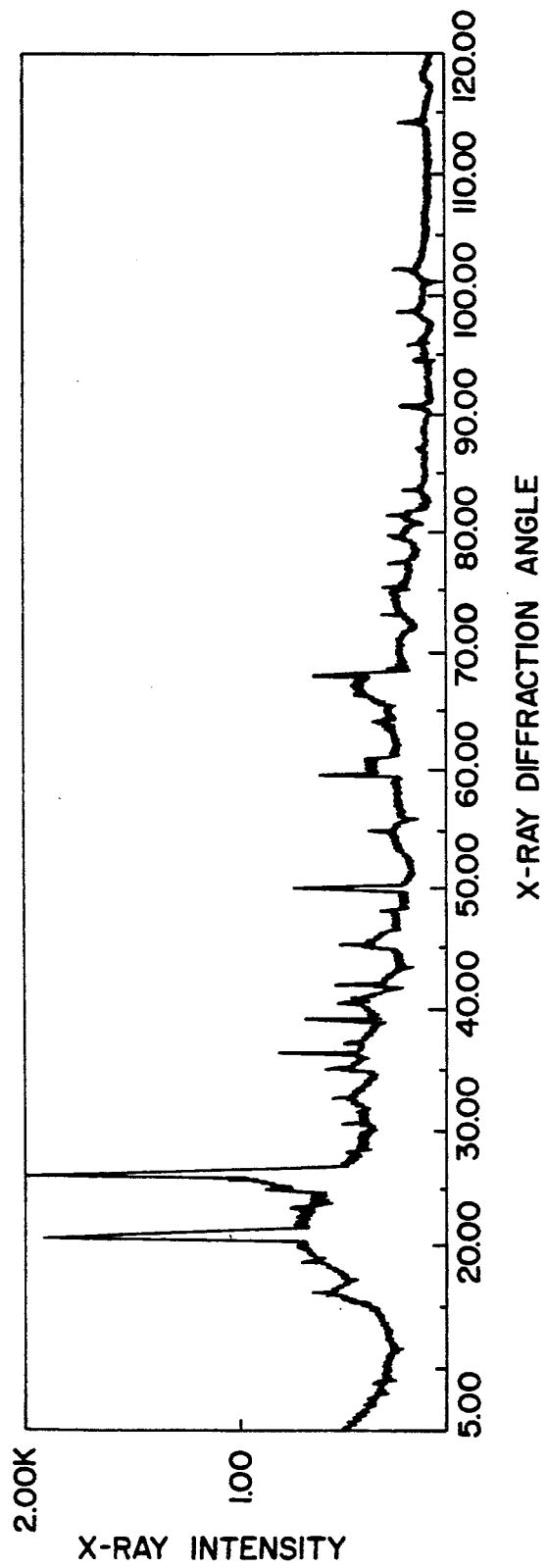
FIG. I(c)

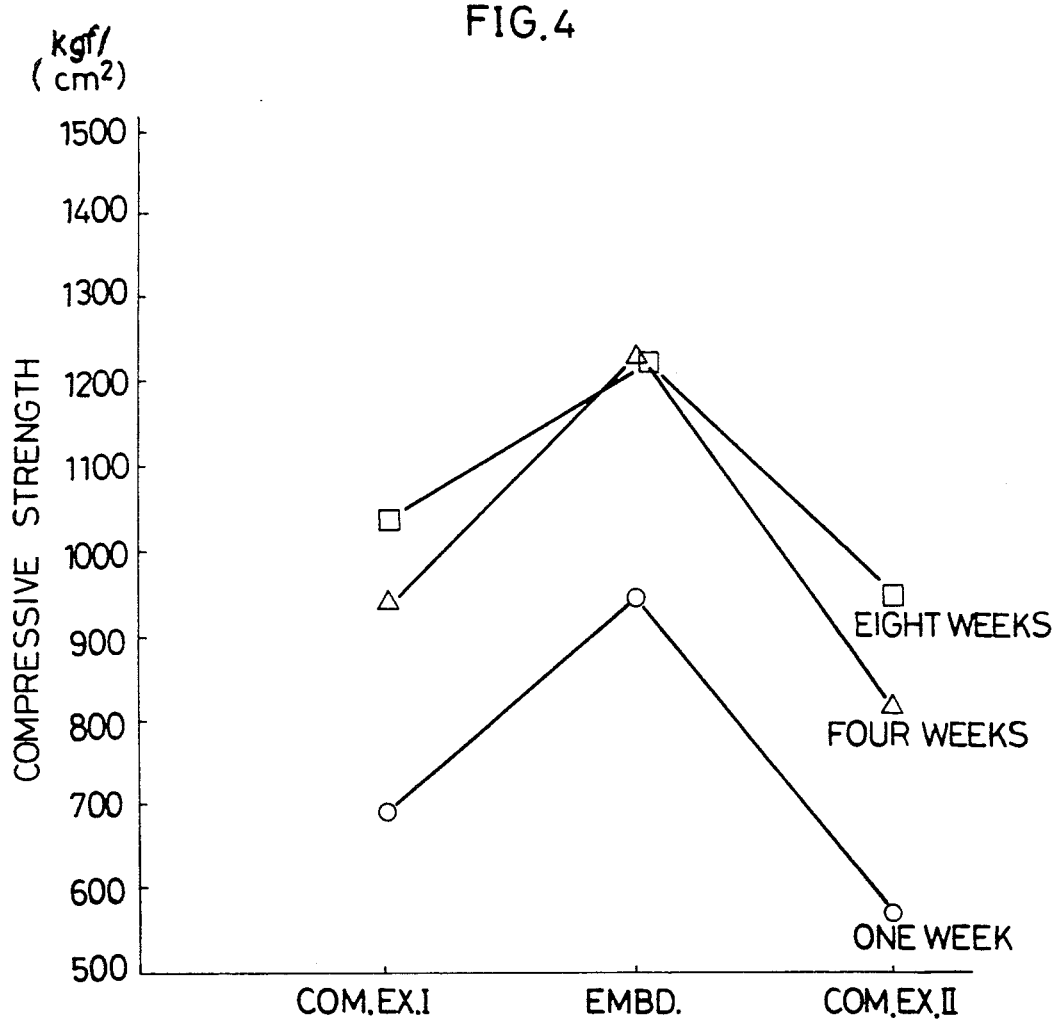

ADMIXTURE AND CEMENT COMPOSITION USING SAME

BACKGROUND OF THE INVENTION (1) Field of the Invention

The present invention relates to an admixture for cement compositions, and to cement compositions such as high strength mortar and high strength concrete using the admixture.

(2) Description of the Prior Art

High strength mortar known heretofore is formed by mixing fine aggregate and silica fume in appropriate quantities into a cement paste of about 30% water-cement ratio. Also known is high strength concrete formed by mixing coarse aggregate in an appropriate quantity into such mortar.

The conventional product including silica fume is highly viscous owing to the presence of silica fume. This results in low fluidity of the product filled into a mold, and hence a disadvantage of low workability.

Silica fume comprises ultra fine particles having diameters about 1/100 of cement. When used as it is, silica fume is difficult to handle since it becomes scattered. Therefore, silica fume usually is used in grains. This results in the disadvantage that a required quality cannot be obtained because of poor dispersibility when kneading time is insufficient. To secure high quality, measures such as extension of the kneading time must be taken, which prolongs the construction period.

On the other hand, as disclosed in U.S. Pat. No. 4,793,861, metakaolin including alumina and silica as main components is added as an admixture in order to promote product strength and to increase alkali-resistance of glass fibers contained in a cement-based product.

According to this known technique, metakaolin is obtained by a heat treatment of kaolinite at 700° to 900° C. However, such metakaolin usually is in the form of fine particles having greatly varying diameters, with numerous particles mixed together some of which are below 0.5 $\mu$m and others over 8 $\mu$m in diameter. The particles below 0.5 $\mu$m in diameter have large specific surface areas, and tend to have increased water absorption accordingly. Thus, a large quantity of a water reducing agent must be used in the case of a low water-cement ratio, which results in the disadvantage of high cost. There is a further disadvantage of a prolonged construction period with a long time consumed in the kneading operation as discussed above. Where coarse particles exceeding 8 $\mu$m in diameter are mixed, a required quality cannot be secured since concrete is not effectively filled to improve its strength.

SUMMARY OF THE INVENTION

An object of the present invention is to provide an admixture which, in obtaining a cement composition such as high strength mortal or high strength concrete, not only realizes increased strength but, with regard to workability, has low viscosity to assure good fluidity and, with regard to quality, has excellent stability little affected by variations in the kneading time and other factors.

Another object of the present invention is to provide a high quality and high strength cement composition which, by using a suitable quantity of the above admixture, exhibits the high strength early and undergoes little drying shrinkage.

In order to achieve the above objects, an admixture is prepared, according to the present invention, by calcining at 630° to 870° C. at least one substance selected from the group consisting of natural kaolin, halloysite and synthetic kaolin, and effecting classification so that amorphous portions of alumina/silica having a mixing ratio of 0.5 to 1.3 form main components, with all particles having diameters up to 8 $\mu$m and an average diameter of 0.5 to 2 $\mu$m, and a specific gravity ranging from 2.45 to 2.55.

As a starting raw material of the admixture, one or more of natural kaolin, halloysite and synthetic kaolin is/are used alone or in combination of two or three.

Natural kaolin is a typical clay mineral supplied by nature, and is called kaolinite to be exact The kaolinite is expressed by a chemical formula $Al_2Si_2O_5(OH)_4$, and its theoretical values are 39.5% of alumina ($Al_2O_3$), 46.5% of silica ($SiO_2$) and 14.0% of water ($H_2O$). Its crystal system is a monoclinic system which exhibits particles of hexagonal plate shapes under an electron microscope. Its thermal property is such that an endothermic peak occurs after 100° C. as a result of shedding of moisture adhering thereto, and that water contained in the form of hydroxyl group OH is shown forming a high endothermic peak around 600° C.

After completion of shedding of the hydroxyl OH, kaolinite becomes an amorphous state called metakaolin, and thereafter an exothermic peak occurs at 900° to 1000° C.

In manufacture of kaolin on a commercial scale, surface soil is removed from kaolin deposits, raw kaolin is collected from kaolin layers, and quartz, mica and other impurities are removed. After this initial refining process, the kaolin is turned into a slurry and sent to a refinery where kaolin undergoes a rinsing process and is dehydrated and dried to become a primary product.

The product is fired in a horizontal or vertical kiln to improve whiteness, opaqueness, electric insulation characteristics, strength and durability, and becomes a final product.

Halloysite is a typical clay mineral supplied by nature and belongs to the kaolin group, but has an excessive water content and low crystallinity. Halloysite is expressed by a chemical formula $Al_2Si_2O_5(OH)_4 \cdot 2H_2O$ and, when dried in nature, changes through an intermediate state of hydration to a state of containing little water between layers. Its crystal system is a monoclinic system which exhibits particles of hexagonal plate shapes under an electron microscope. Its thermal property is such that an endothermic peak occurs after 100° C. as a result of shedding of the interlayer water, and that water contained in the form of hydroxyl group OH is shown forming a high endothermic peak around 550° C.

Synthetic kaolin is manufactured from a solution containing aluminum and silicon under various vapor pressures at 150° to 450° C., by a coprecipitation method mixing solutions at a low temperature (room temperature), by an aluminum-organic substance complex decomposition method, or by a method of synthesis under a hydrothermal condition using natural minerals. Its alumina/silica mixing ratio is 1.1 to 1.3. When the mixing ratio is below 1.1, a required quality cannot be obtained with insufficient strength When the mixing ratio exceeds 1.3, a required quality cannot be obtained because of a delay in hardening of cement due to an excessive quantity of alumina.

The temperature for calcining the above admixture is controlled to be from 630° to 870° C. When the calcining temperature is below 630° C., amorphous components maintaining the molecular structure becomes reduced to obstruct a pozzolanic reaction. When the calcining temperature exceeds 870° C., the original structure collapses to cause crystal transformation, resulting in recrystallization to form a different mineral, thereby reducing the amorphous components to obstruct a pozzolanic reaction.

The admixture is classified so that all particles have diameters not exceeding 8 μm and an average diameter of 0.5 to 2 μm. When coarse particles exceeding 8 μm in diameter are present in the admixture, the concrete is not filled sufficiently to enhance strength as noted hereinbefore.

If the average particle diameter is below 0.5 μm, the use quantity of a water reducing agent increases when the water-cement ratio is low, thereby posing the problem of kneading difficulties. With the average particle diameter exceeding 2.0 μm, sufficient strength cannot be obtained.

The admixture is adjusted to a specific gravity ranging from 2.45 to 2.55. If the specific gravity is below 2.45, the alumina/silica ratio is affected to produce no strengthening effect. If the specific gravity exceeds 2.55, there occurs an inconvenience of an excessive quantity of alumina delaying hardening.

In a further aspect of the invention, a cement composition comprises an admixture prepared by calcining at 630° to 870° C. at least one substance selected from the group consisting of natural kaolin, halloysite and synthetic kaolin, and effecting classification so that amorphous portions of alumina/silica having a mixing ratio of 0.5 to 1.3 form main components, with all particles having diameters up to 8 μm and an average diameter of 0.5 to 2 μm, and a specific gravity ranging from 2.45 to 2.55, said admixture is added to cement in 5 to 30% by weight of the cement, with which fine aggregate, a water reducing agent and water are mixed.

The admixture is added to the cement in 5 to 30% by weight of the cement. Added in less than 5%, the admixture produces little effect. In excess of 30%, strength is enhanced to an insufficient degree. Thus, 10 to 20% is a preferred range.

The aggregate may be selected from ordinary sand, gravel, and crushed stone, and from such hard aggregates as silica stone, pyrite, hematite, magnetic iron ore, topaz, lawsonite, corundum, phenacite, spinel, beryl, chrysoberyl, electric stone, granite, andalusite, staurolite, zircon, baked bauxite, silicon carbide, tungsten carbide, ferrosilicon nitride, silicon nitride, fused silica, electrochemical magnesia, cubic silicon nitride, iron powder, iron balls, heavy calcined alum and fused alumina.

The water reducing agent may be selected from substances having, as main components thereof, salt of naphthalenesulfonic acid formaldehyde condensate, salt of melaminesulfonic acid formaldehyde condensate, polymeric lignin sulfonate and salts of organic acid polymer.

The cement may be selected from portland cements of the ordinary, rapid curing, high rapid curing, white, sulfate resisting types, and from blended cements blended with blast furnace slag, fly ash and the like.

It has been found through various experiments that a cement composition such as high strength mortar or high strength concrete, by using the admixture prepared under the conditions of a calcining temperature, alumina/silica mixing ratio, maximum diameter of all particles, average particle diameter and specific gravity all controlled as set out hereinbefore, exhibits sufficient strength as where silica fume is used as an admixture, and realizes the high strength early, with reduced drying shrinkage, in spite of a relatively low viscosity.

Consequently, the cement composition has high fluidity because of a narrow range of particle sizes, low viscosity and no cementing ability, and is easy to agitate so that the composition may be mixed reliably with a short time. Thus, the cement composition of the present invention is little affected by mixing time, may be filled into a mold speedily and easily, and assures a steady quality.

The high fluidity promotes the filling operation, and allows concrete surfaces to be finished easily and in an excellent way. This feature provides the further advantages of shortened construction periods and of a stabilized and improved quality with regard to compressive strength and drying shrinkage.

The high strength mortar which is a cement composition obtained by mixing the foregoing admixture in 5 to 30% by weight of the cement, to which an aggregate, water reducing agent and water are mixed, realizes the high strength early to promote workability, with reduced drying shrinkage which assures a steady quality for increased strength. This applies also to the high strength concrete which is a cement composition obtained by mixing the high strength mortar with coarse aggregate.

BRIEF DESCRIPTION OF THE DRAWINGS

FIGS. 1 (a) through (c) are graphs showing relations between X-ray diffraction angle and X-ray intensity, FIG. 4 is a graph comparing compressive strength.

DESCRIPTION OF THE PREFERRED EMBODIMENTS

Figure 2:
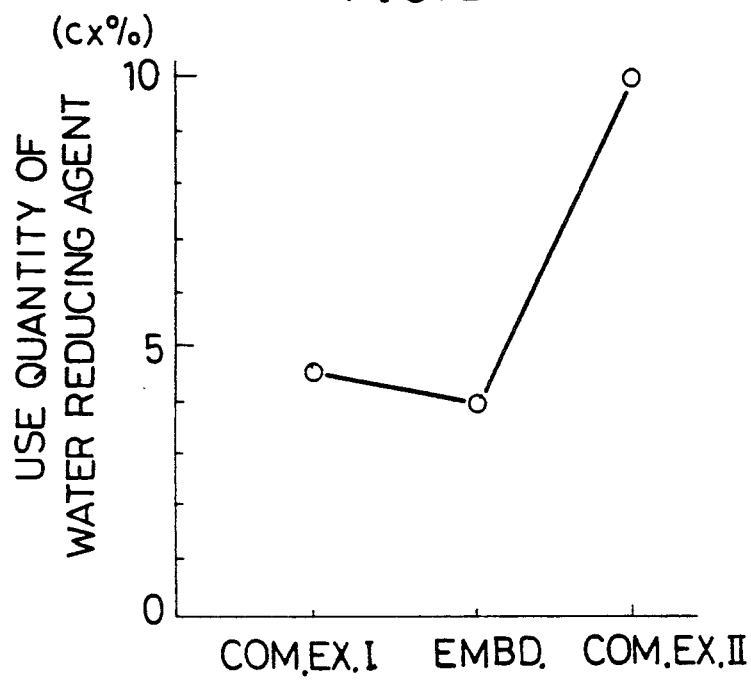
FIG. 2 is a graph comparing use quantities of a water reducing agent.

Next, embodiments of the present invention will be described in detail with reference to the drawings

Admixture in Embodiment

First, a kaolin slurry is prepared by mixing kaolin, water and a dispersing agent such as sodium tripolyphosphate.

The slurry is then classified by gravity separation and centrifugal separation to obtain an average particle diameter 1 to 2 μm and to remove impurities.

Thereafter the product is ground and classified so that all particles have diameters not exceeding 8 μm and that the average diameter becomes 0.5 to 2 μm.

Then, the product is dehydrated and dried, and calcined at a controlled temperature ranging from 630° to 870° C. As a result, an admixture is prepared and refined which has alumina and silica as main components, with an alumina/silica mixing ratio at 1.1 to 1.3, and a specific gravity of 2.45 to 2.55.

Results of X-ray diffraction tests will be described next, which tests have been conducted to verify degrees of non-crystallization of the above admixture and comparative examples.

The above admixture was used as an embodiment of the present invention, and admixtures in the first and second comparative examples were used for comparison purposes.

Admixture of Comparative Example I

Kaolin which is the starting raw material of the above admixture in the embodiment of the invention was used.

Admixture of Comparative Example II

Kaolin as used in the above admixture in the embodiment was just fired at 900° to 1000° C. without calcining.

Each of the admixtures in the embodiment, comparative examples I and II was packed in an equal quantity (500 mg) in a sample holder of aluminum, and measured by the power X-ray diffraction method (reflection method). FIGS. 1 (a), (b) and (c) show respective measurement results, in which the vertical axis represents X-ray intensity and the horizontal axis X-ray diffraction angle (2θ=180°).

The measurement conditions are as follows:
(1) X-ray Generator
RU-200B (rotary twin cathode type) manufactured by Rigaku Denki K.K.
X-ray Source: CuKa-ray Curved crystal monochrometer (graphite) is used.
(2) Goniometer
Model 2155D manufactured by Rigaku Denki K.K.
Slit System: 1.0° - 0.15 mm - 1.0°
Detector: Scintillation Counter
(3) Count Recorder
Model RAD-B manufactured by Rigaku Denki K.K.

It is clear from the above results that the admixture in the embodiment has lower diffraction peaks, stronger diffuse scattering, and a higher degree of non-crystallization, and more readily shows pozzolanic reaction when used as an admixture, than the admixtures of comparative examples I and II.

Next, mortars in an embodiment of the present invention and comparative examples will be described.

Mortar in Embodiment

Ordinary portland cement (JIS R 5210) and standard sand from Toyoura were added as cement and aggregate, respectively, to the admixture prepared and refined as above. These components were dry mixed for 15 seconds, and thereafter mixed with Tyupoll HP-8 Improved (manufactured by Takemoto Yushi K.K.) acting as a high-performance water reducing agent, and water. The product was agitated for 30 seconds and then scraped off, and finally agitated for 120 seconds to obtain a mortal sample. An omni-mixer was used for both the dry mixing and agitation.

Mortar of Comparative Example I

The admixture was removed from the above embodiment, and a mortar sample was prepared in the same way as the above embodiment.

Mortar of Comparative Example II

Silica fume from Iceland was mixed as an admixture into the above comparative example I, and a mortar sample was prepared in the same way as the above embodiment.

Table 1 below shows mixing rations of the admixture in the above embodiment and the silica fume of comparative example II.

TABLE 1

| (Mortar) | Emb. | C.E. II |
|---|---|---|
| Average part. diam (μm) | 1.40 | 0.15 |
| Oil Absorp. (cc/g) | 50–60 | 50–60 |
| PH | 5–6 | 5–7 |
| Water (%) | 0.5 | 0.8 |
| Chemical Composition (%) | | |
| $SiO_3$ | 52.0 | 96.0 |
| $Al_2O_3$ | 44.6 | 0.3 |
| $Na_2O$ | 0.2 | 0.2 |
| $TiO_2$ | 1.9 | — |
| $Fe_2O_3$ | 0.5 | 0.2 |
| $K_2O$ | 0.1 | 0.5 |
| CaO | 0.03 | 0.2 |

Table 2 shows mixing ratios for preparation of the mortar samples.

TABLE 2

| (Mortar) | Emb | C.E. I | C.E. II |
|---|---|---|---|
| Water-Cement Ratio (%) | 25 | 25 | 25 |
| Quantities (kg/m³) | | | |
| Cement | 848 | 1,060 | 848 |
| Water | 266 | 266 | 266 |
| Fine aggregate | 660 | 660 | 660 |
| Admixture | 212 | 0 | 212 |
| Water red. agent (%) (by weight of cement) | 4.0 | 4.5 | 10.0 |

With the above mortar samples, properties of unhardened mortar were checked by measuring air content (%: by a method according to JIS A 6201), temperatures (°C.: measured with a long thermometer) and flows (mm: by a method according to JIS R 5201). Compressive strengths (kgf/cm²) were also measured at ages of one week, four weeks and eight weeks.

Table 3 shows the measurement results.

TABLE 3

|  | Emb. | C.E. I | C.E. II |
| --- | --- | --- | --- |
| Air content (%) | 3.2 | 4.1 | 3.3 |
| Flow (mm) | 178 × 167 | 208 × 198 | 135 × 133 |
| Initial Mortar Temp. (°C.) | 29.5 | 29.0 | 30.0 |
| Compress. strength (kgf/cm$^2$) |  |  |  |
| 1 week | 957 | 695 | 582 |
| 4 weeks | 1,229 | 957 | 823 |
| 8 weeks | 1,227 | 1,031 | 959 |

Figure 3:
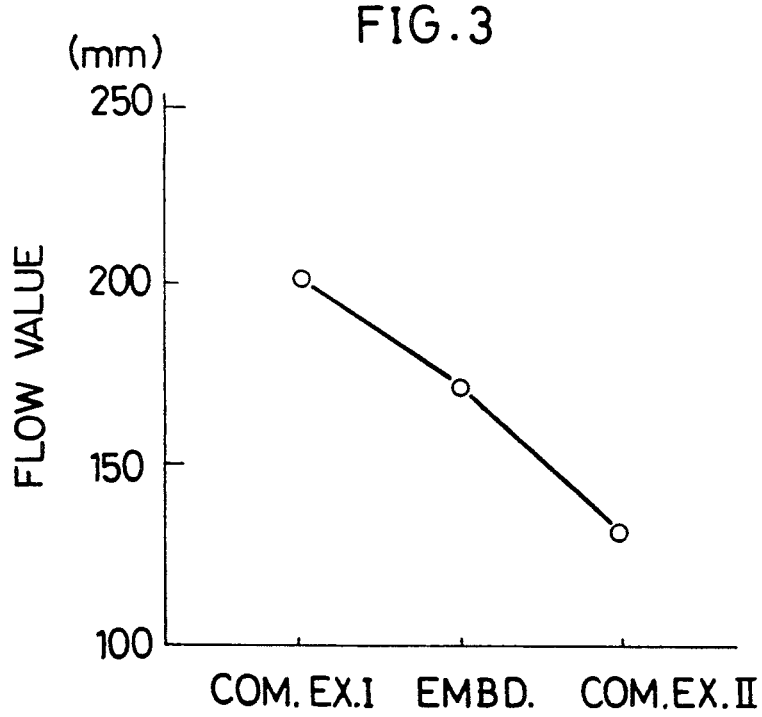
FIG. 3 is a graph comparing fluidity.

FIGS. 2, 3 and 4 show graphs comparing quantities of water used, fluidity (flows) and compressive strength, respectively.

It is clear from the above results that the high strength mortar according to the present invention exhibits the high strength earlier, and has a greater compressive strength than comparative examples I and II. Further, the motor according to the invention has excellent fluidity though the admixture is added thereto.

The results show that comparative example II using silica fume as an admixture has a lower strength than comparative example I not using an admixture. This is considered due to the same agitating condition which resulted in insufficient dispersion of silica fume in granules. That is, sufficient dispersion is expected to give comparative example II a strength close to the embodiment of the invention.

High strength concrete will be described next.

Concrete in Embodiment

The admixture prepared and refined as above, ordinary portland cement (JIS R 5210), a sand mixture of sea sand off Ogi Island (70%) and crushed sand from Ako (30%) acting as fine aggregate, and crushed stone from Ako (specific gravity: 2.63) acting as coarse aggregate were dry mixed for 15 seconds, and thereafter mixed with Tyupoll HP-8 Improved (manufactured by Takemoto Yushi K.K.) acting as a high-range water reducing agent, and water in a 30% water-cement ratio. The product was agitated for 30 seconds and then scraped off, and finally agitated for 120 seconds to obtain two concrete samples (Nos. 1a and 1b described later). The admixture was added in 15% of the cement. A forced mixing type mixer was used for both the dry mixing and agitation.

Concrete of Comparative Example I

The admixture was removed from the above embodiment, and two concrete samples (samples Nos. 2a and 2b described later) were prepared in the same way as the above embodiment.

Concrete of Comparative Example II

Silica fume from Iceland was mixed as an admixture into the above comparative example I, and two concrete samples (samples Nos. 3a and 3b) were prepared in the same way as the above embodiment

Concrete of Comparative Example III

Metakaolin (containing particles exceeding 8 μm in diameter in 15 to 25% of all particles) was mixed as an admixture into the above comparative example I, and a concrete sample (sample No. 4 described later) was prepared in the same way as the above embodiment.

Concrete of Comparative Example IV

Fine powder of silica having a 5 μm average particle diameter was mixed as an admixture into the above comparative example I, and a concrete sample (sample No. 5 described later) was prepared in the same way as the above embodiment.

Concrete in Comparative Example V

The same admixture as used in the above embodiment but just fired instead of being calcined was mixed as an admixture into the above comparative example I, and a concrete sample (sample No. 6 described later) was prepared in the same way as the above embodiment.

Table 4 below shows chemical compositions and average characteristics of the admixture in the above embodiment and in the comparative examples II, III, IV and V.

TABLE 4

|  | (Concrete) | | | | |
| --- | --- | --- | --- | --- | --- |
|  | Emb. 1a, 1b | II 3a, 3b | III 4 | IV 5 | V 6 |
| Av. part. diam. (μm) | 1.40 | 0.15 | 1.5 | 0.8 | 1.4 |
| Oil Abs. (cc/g) | 50–60 | 50–60 | 70–80 | 40–50 | 45–55 |
| PH | 5–6 | 5–7 | 5–7 | 4–5 | 8.5–9.5 |
| Water (%) | 0.5 | 0.8 | 0.4 | 0.8 | 0.5 |
| Chem. Comp. (%) | | | | | |
| SiO$_2$ | 52.0 | 96.0 | 56.91 | 98.0 | 52.3 |
| Al$_2$O$_3$ | 44.6 | 0.3 | 39.68 | — | 44.6 |
| Na$_2$O | 0.2 | 0.2 | — | — | 0.2 |
| TiO$_2$ | 1.9 | — | 0.54 | — | 1.6 |
| Fe$_2$O$_3$ | 0.5 | 0.2 | 0.93 | — | 0.6 |
| K$_2$O | 0.1 | 0.5 | — | — | 0.02 |
| CaO | 0.03 | 0.2 | 0.32 | — | 0.03 |

Table 5 shows mix proportions for preparation of the concrete samples in the above embodiment and comparative examples I through V.

TABLE 5

|  | (Concrete) | | |
| --- | --- | --- | --- |
|  | Emb. 1a, 1b | I 2a, 2b | II–V 3a, 3b, 4, 5 & 6 |
| Wat./Cem. Rat. (%) | 30 | 30 | 30 |
| Quantities (kg/m$^3$) | | | |
| Cement | 496 | 583 | 496 |
| Water | 175 | 175 | 175 |
| Fine aggr. | 549 | 549 | 549 |
| Coarse aggr. | 1,040 | 1,040 | 1,040 |
| Cement adm. | 87 | 0 | 87 |

With the above concrete samples, properties of fresh concrete were checked by measuring use quantities of the high-range water reducing agent, slump (cm), air content (%: by a method according to JIS A 6201), initial concrete temperatures (° C.: measured with a long thermometer) and flows (mm: by a method according to JIS R 5201).

Figure 6:
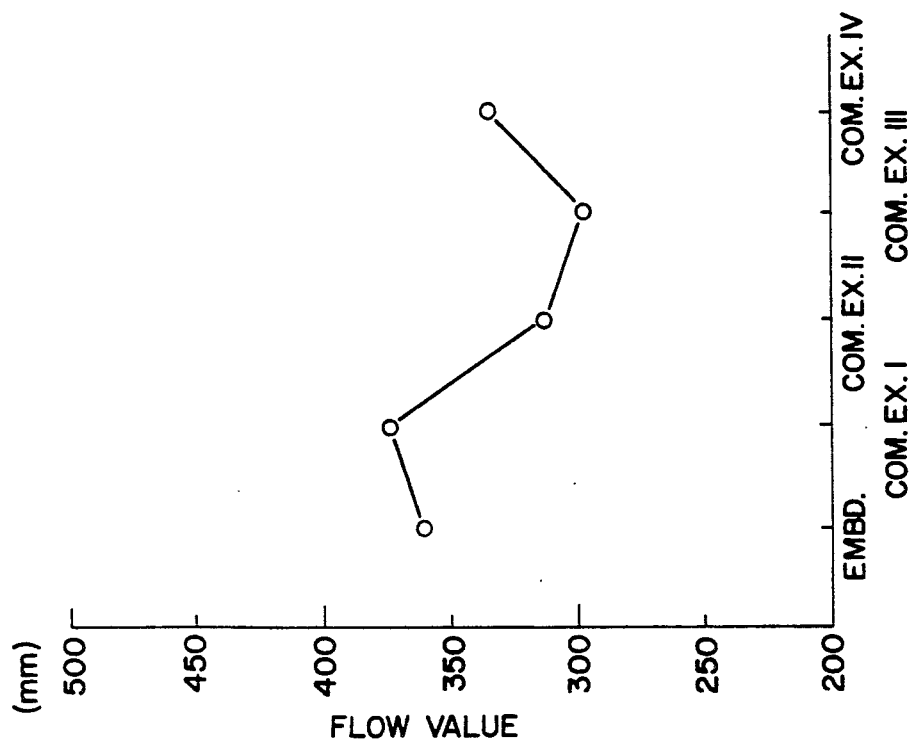
FIG. 6 is a graph comparing fluidity.
Figure 5:
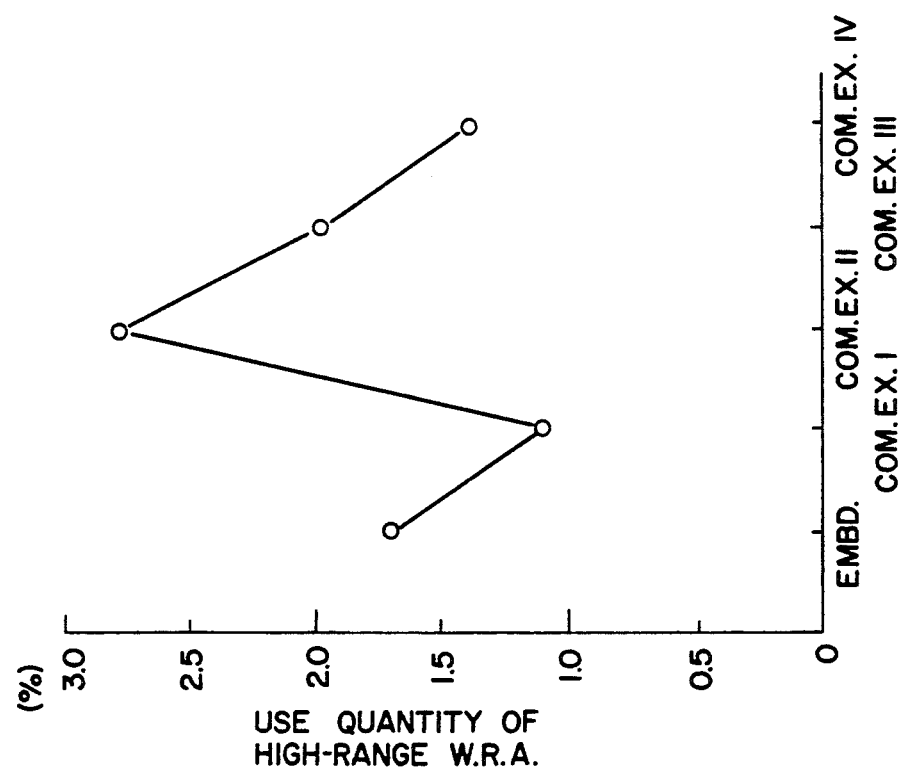
FIG. 5 is a graph comparing use quantities of a high-performance water reducing agent.

Table 6 shows the test results. FIG. 5 shows a graph comparing average use quantities of the high-range water reducing agent when the slump becomes 19 cm, among the samples excluding that of comparative example V. FIG. 6 shows a graph comparing fluidity similarly when the slump becomes 19cm. In these graphs, values corrected on the basis of two types of values being averaged are shown for the embodiment and comparative examples 1 and 2, while values corrected on the basis of values in the table are shown for comparative examples III and IV. These values are as follows: Use Quantities of the Water Reducing Agent Embodiment: 1.71, Comparative Example I: 1.13, Comparative Example II: 2.79, Comparative Example III: 1.95, Comparative Example IV: 1.38, and Comparative Example V: 1.90 Fluidity Embodiment: 361, Comparative Example I: 375, Comparative Example II: 314, Comparative Example III: 299, Comparative Example IV: 335, and Comparative Example V: 530

TABLE 6

|  | 1a | 1b | 2a | 2b | 3a | 3b | 4 | 5 | 6 |
|---|---|---|---|---|---|---|---|---|---|
| W. r. a. (%) | 1.85 | 1.60 | 1.10 | 1.20 | 2.80 | 2.30 | 1.90 | 1.40 | 1.90 |
| Slump (cm) | 19.6 | 19.5 | 16.8 | 19.5 | 21.3 | 21.5 | 20.5 | 25.0 | 25.0 |
| Air cont. (%) | 3.3 | 2.2 | 2.9 | 2.3 | 3.0 | 2.3 | 2.9 | 0.6 | 2.0 |
| Flow (mm) | 364 | 369 | 269 | 376 | 450 | 434 | 386 | 498 | 530 |
| Temp. (°C.) | 24.0 | 26.0 | 24.5 | 25.5 | 25.0 | 25.0 | 24.0 | 25.5 | 24.0 |

In Table 6, the water reducing agent is shown in percentage (%) with respect to the cement weight.

Further, ages (in days) of the respective samples reaching the maximum temperature were checked, and the results are as follows:

1a; 11:25, 1b; 11:00, 2a; 13.15, 2b; 12:30, 3a; 15:20, 3b; 14:00, 4; 13:35, 5; 15:30, and 6; 14:00.

Figure 8:
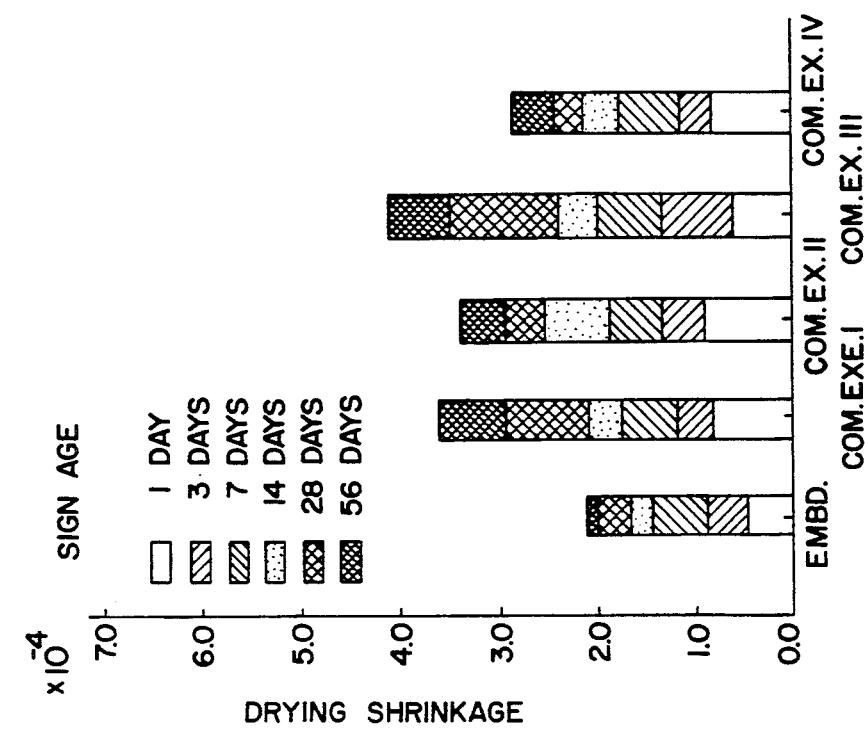
FIG. 8 is a graph comparing variations in drying shrinkage.
Figure 7:
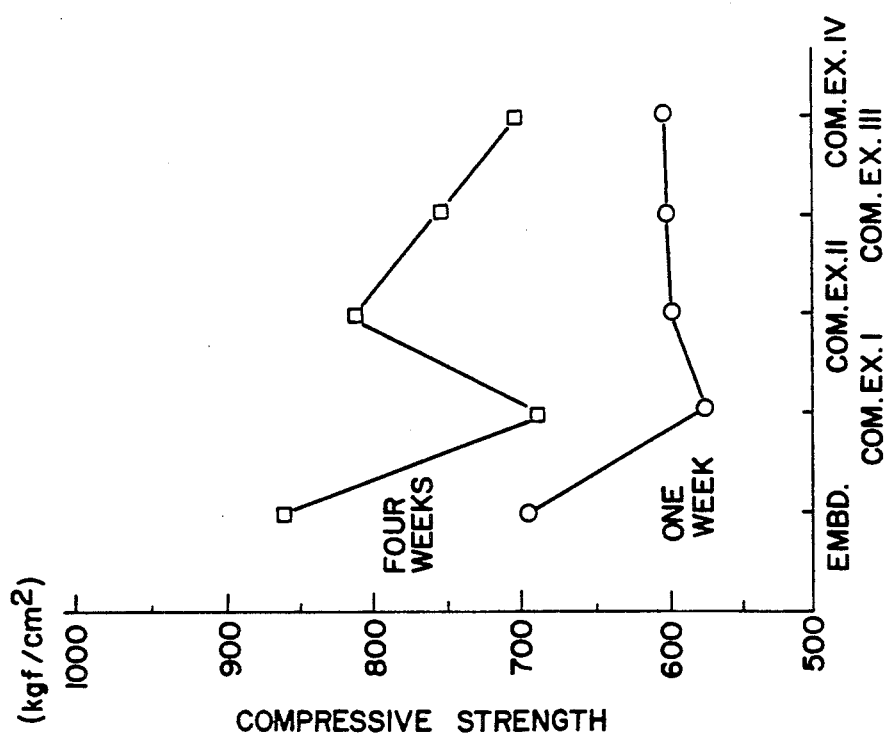
FIG. 7 is a graph comparing compressive strength.
Figure 9:
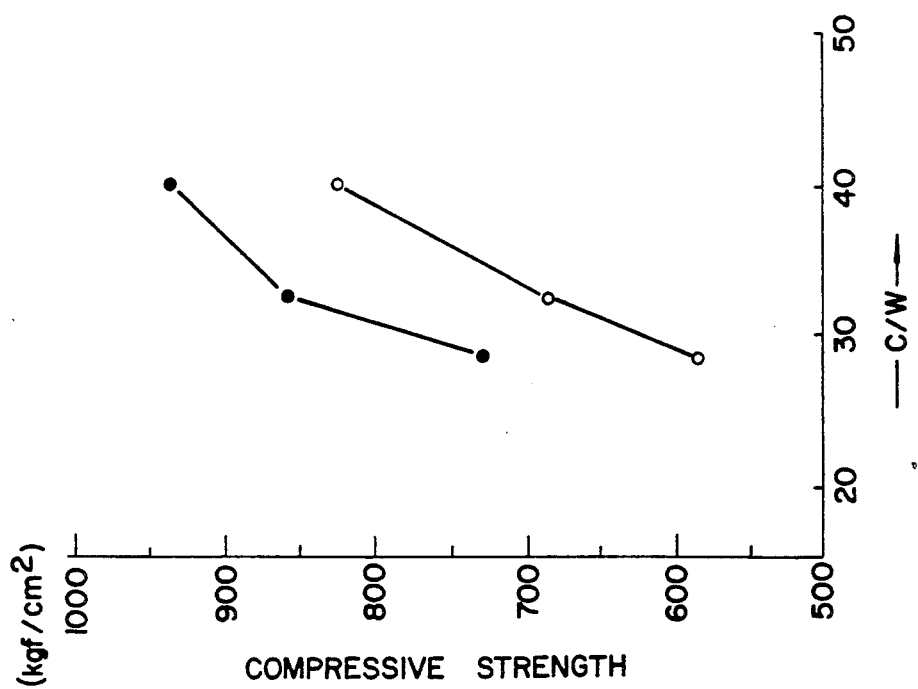
FIG. 9 is a graph showing relations between compressive strength and cement to water ratio.

The respective samples were measured also with regard to compressive strength (kgf/cm2) at ages of one week and four weeks, and drying shrinkage ($\times 10^{-6}$) (JIS A 1129) at ages of one week, four weeks, eight weeks, three months, six months and eight months. Table 7 shows the measurement results. FIG. 7 shows a graph comparing compressive strength among the samples excluding that of comparative example V. FIG. 8 shows a graph comparing degrees of drying shrinkage. FIG. 9 shows a graph of relations between compressive strength and cement-water ratio (C/W).

Figure 10:
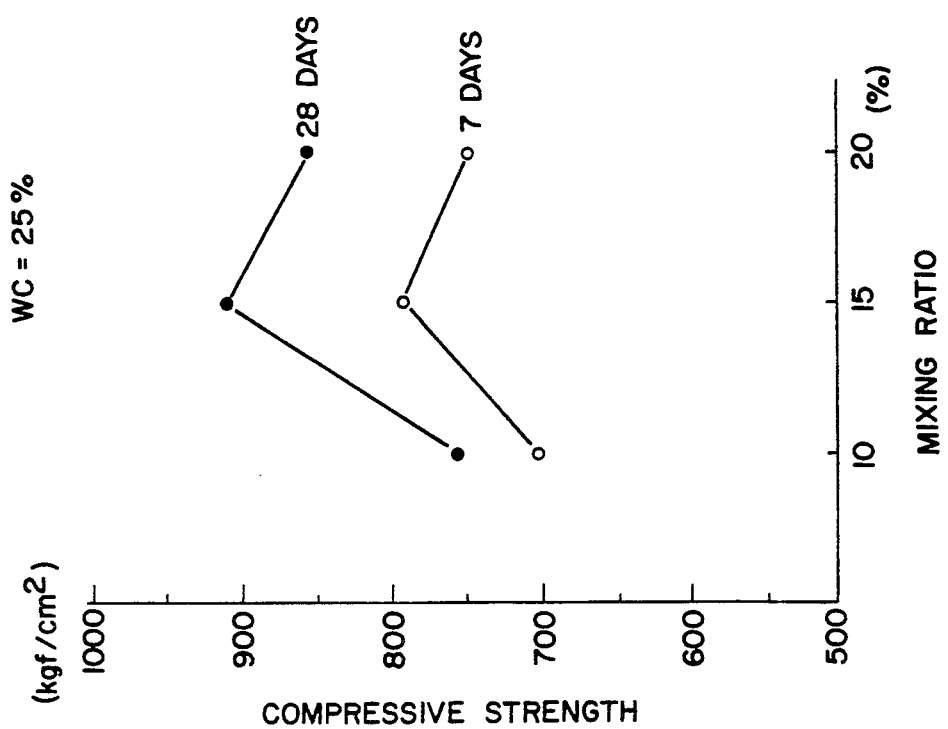
FIG. 10 is a graph showing relations between admixture mixing ratio and compressive strength at a 5% water-cement ratio.
Figure 11:
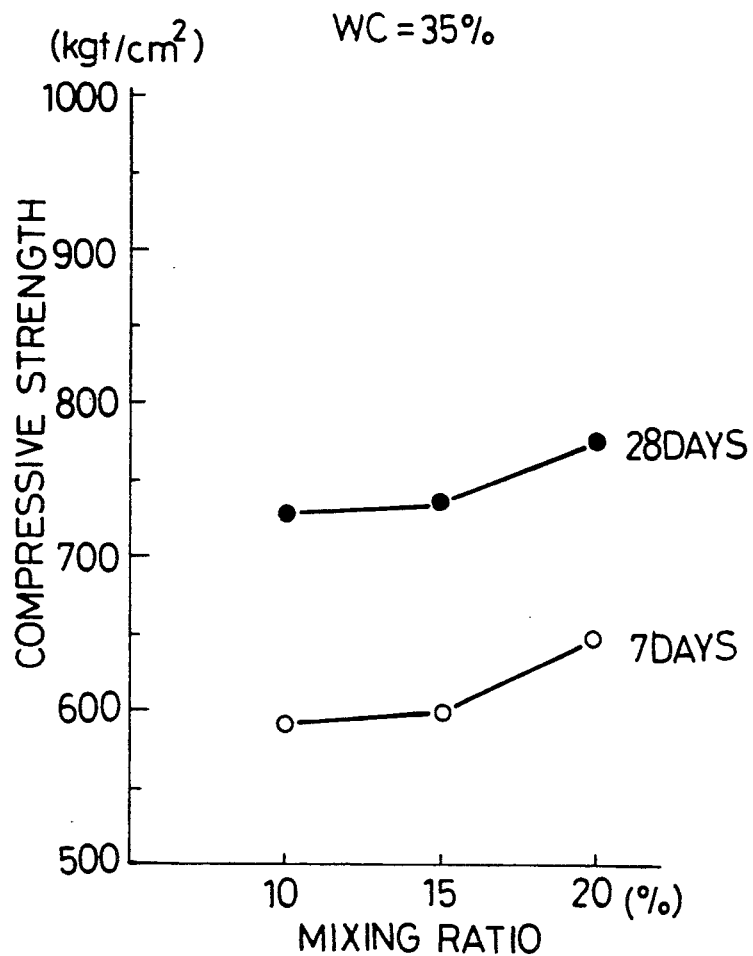
FIG. 11 is a graph showing relations between admixture mixing ratio and compressive strength at a 5% water-cement ratio, FIGS. 12 (a) through (c) are graphs showing relations between X-ray diffraction angle and X-ray intensity, FIGS. 13 (a) through (c) are photographs taken with an electron microscope of crystal structures of an admixture in an embodiment of the present invention, silica fume and an admixture of a second comparative example, respectively, FIGS. 14 (a) through (c) are graphs showing relations between X-ray diffraction angle and X-ray intensity.

In the graph comparing compressive strength, averages of two types of values are shown for the embodiment and comparative examples I and II. The graph comparing the degrees of drying shrinkage is based on the value of 1a for the embodiment, the value of 2a for comparative example I, and the value of 3a for comparative example II.

sured by varying its water-cement ratio and the ratio of the admixture added with respect to the cement (expressed in percentage by weight). Table 8 shows the measurement results. FIG. 10 shows a graph of relations, in the samples of the embodiment, between mixing ratio of the admixture and compressive strength, at the 25% water-cement ratio. Further, FIG. 11 shows a graph of relations, in the samples of the embodiment, between mixing ratio of the admixture and compressive strength, at the 35% water-cement ratio.

TABLE 8

| W/C ratio (%) | Mix ratio (%) | Comp. Str. (kgf/cm$^2$) | |
|---|---|---|---|
|  |  | 7 days | 28 days |
| 25 | 10 | 741 | 791 |
| 25 | 15 | 824 | 948 |
| 25 | 20 | 777 | 893 |
| 30 | 0 | 554 | 685 |
| 30 | 0 | 598 | 695 |
| 30 | 15 | 691 | 834 |
| 30 | 15 | 698 | 886 |
| 35 | 10 | 593 | 731 |
| 35 | 15 | 599 | 738 |
| 35 | 20 | 650 | 772 |

It is inferred from these results that, for practical purposes, the admixture may be added in the ratio ranging from 5 to 30% with respect to the cement, and suitably in the range of 10 to 20%.

Experimentation has been made in order to infer a mechanism for promoting the strength of concrete with the admixture according to the present invention, the results of which will be described next.

The admixture of the foregoing embodiment, silica fume, and the admixture of the comparative example II which had only been fired were used as admixtures. 1 g

TABLE 7

|  | 1a | 1b | 2a | 2b | 3a | 3b | 4 | 5 | 6 |
|---|---|---|---|---|---|---|---|---|---|
| Comp. str. (kgf/cm$^2$) | | | | | | | | | |
| 7 days | 691 | 698 | 554 | 598 | 594 | 620 | 597 | 600 | 618 |
| 28 days | 834 | 886 | 685 | 695 | 784 | 814 | 749 | 703 | 799 |
| Drying shrink. ($\times 10^{-6}$) | | | | | | | | | |
| 1 day | 51 | 47 | 74 | 87 | 74 | 90 | 63 | 78 | 75 |
| 3 days | 91 | 94 | 116 | 124 | 128 | 126 | 128 | 109 | 132 |
| 7 days | 134 | 113 | 174 | 179 | 176 | 184 | 199 | 175 | 207 |
| 14 days | 172 | 159 | 205 | 188 | 256 | 251 | 231 | 209 | 241 |
| 28 days | 196 | 206 | 300 | 284 | 287 | 296 | 351 | 244 | 340 |
| 56 days | 203 | 231 | 372 | 368 | 325 | 331 | 406 | 284 | 391 |
| 3 months | 184 | 222 | 371 | 381 | 337 | 346 | 429 | 346 | 401 |
| 6 months | 220 | 243 | 401 | 392 | 348 | 357 | 435 | 333 | 422 |
| 8 months | 244 | 257 | 435 | 428 | 378 | 375 | 472 | 363 | 446 |

It is clear from the above results that the samples in the embodiment of the present invention exhibit the high compressive strength early and have excellent workability. It is also clear that these samples have only minor drying shrinkage, and an improved quality with little cleavage resulting from drying.

Figure 12A:
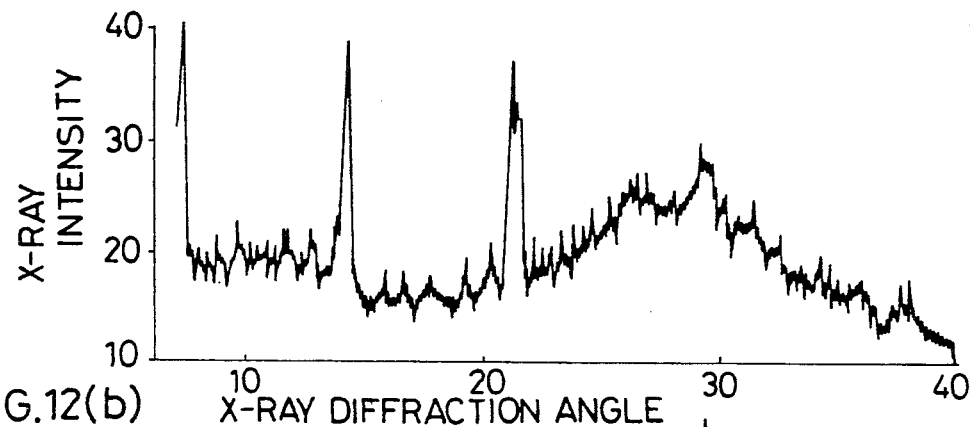
Figure 12B:
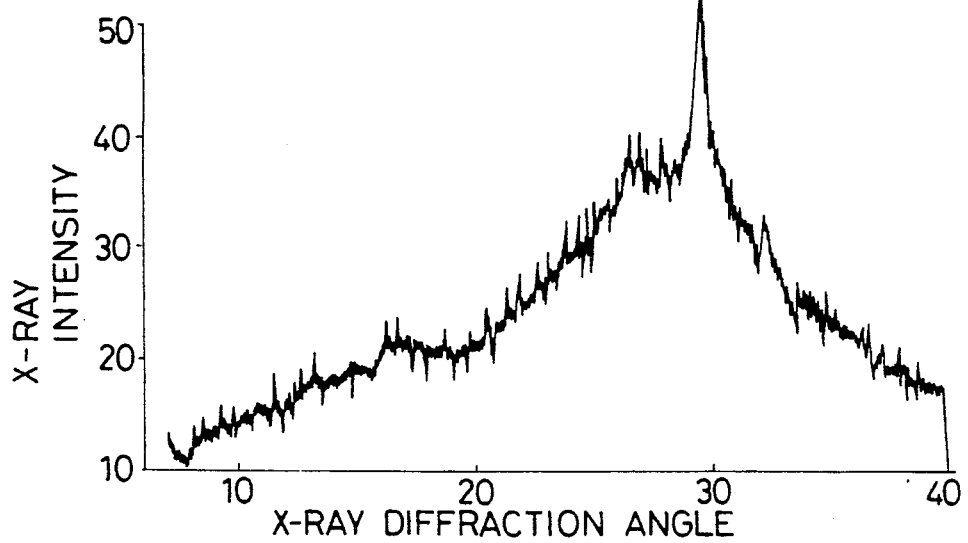
Figure 12C:
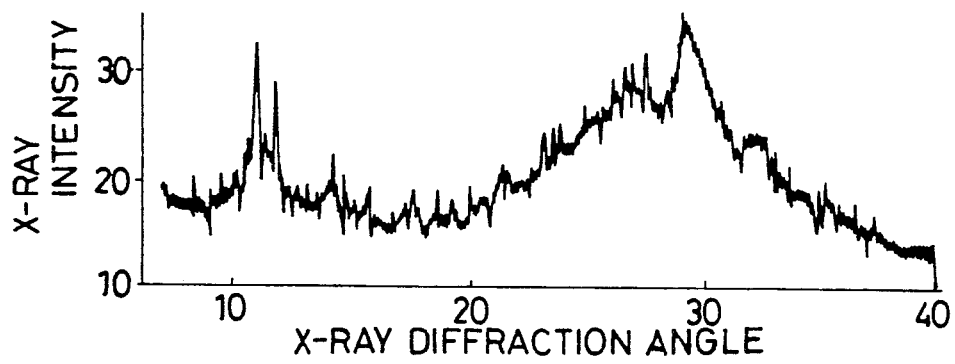
Figure 13A:
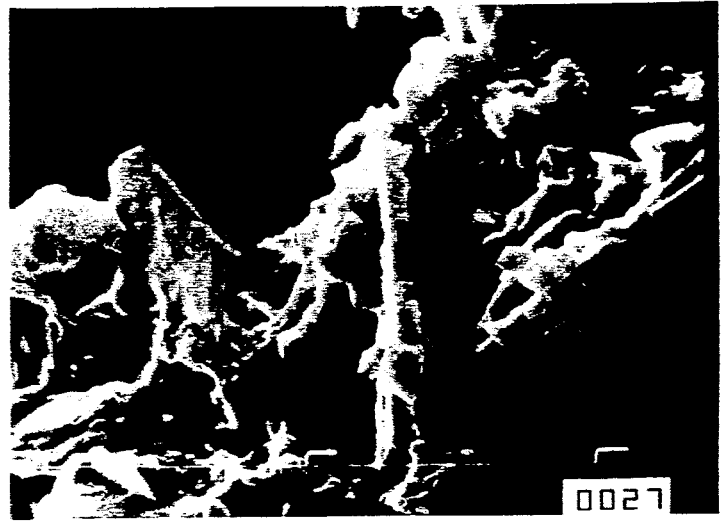
Figure 13B:
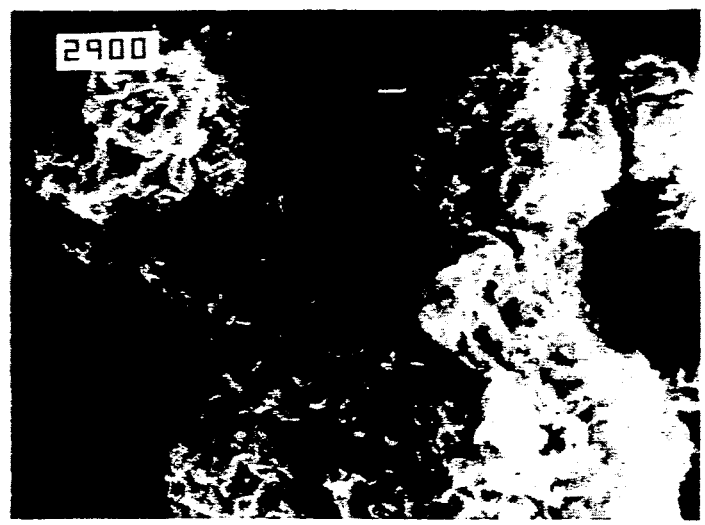
Figure 13C:

The compressive strength of the concrete using the admixture according to the present invention was meaof calcium hydroxide Ca(OH)$_2$ and 30 g of pseudo-bleeding water were added to 1 g of each admixture. Samples were prepared by dispersing the mixture with ultrasonic wave for five minutes. Each sample as prepared above was shaken once a week. Upon lapse of two months by which the samples had completely gelled, the reaction products were identified by the same powder X-ray diffraction method as described hereinbefore. The results are shown in FIG. 12. Also, the configurations were observed with an electron microscope (power: 5000). The results are shown in FIG. 13.

Figure 14A:
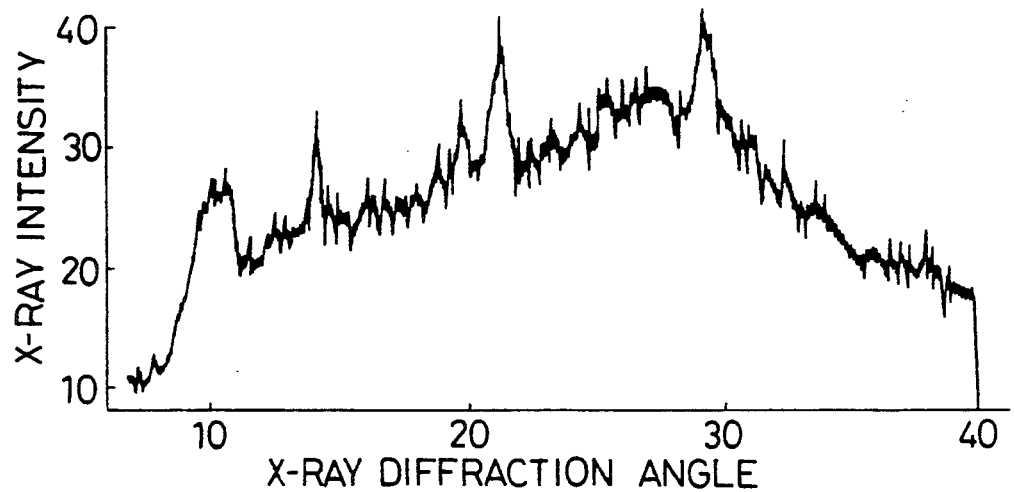
Figure 14B:
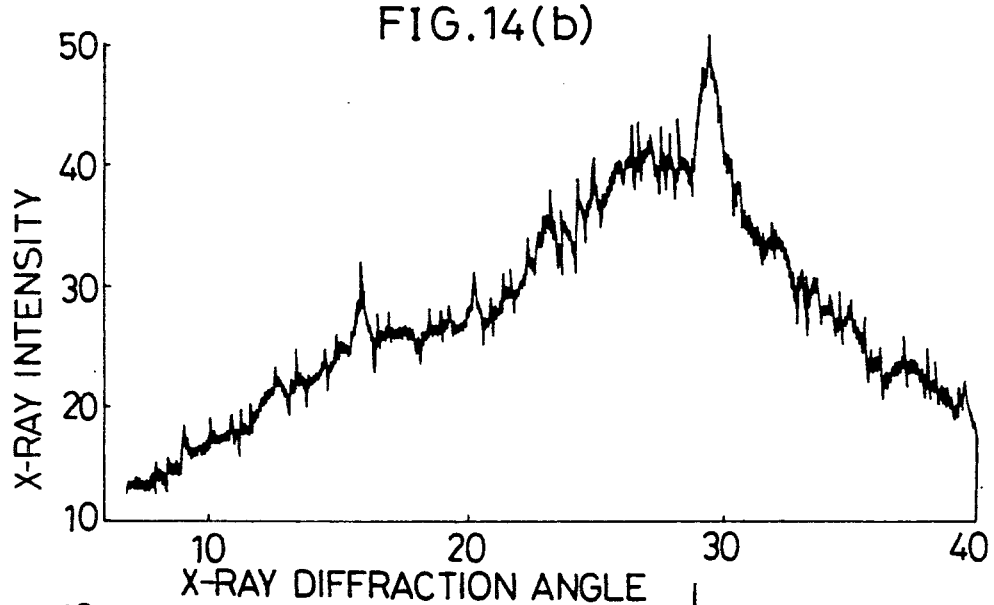
Figure 14C:
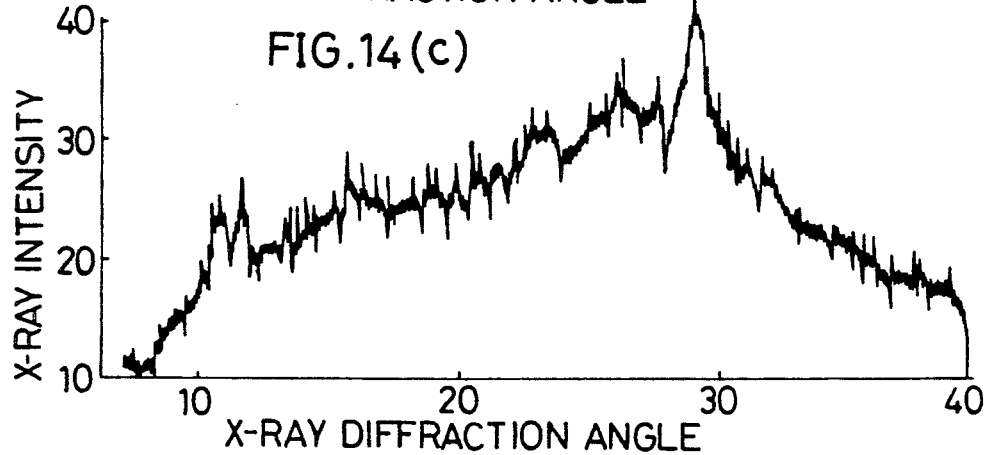

The above pseudo-bleeding water was prepared by dissolving 3.65 g of sodium hydroxide NaOH, 8.02 g of potassium hydroxide and 1.27 g of calcium hydroxide $Ca(OH)_2$ in 1 liter of water in accordance with a mixing ratio obtained from an analysis of bleeding water for cement. 1 g of cement and 30 g of water were added to 1 g of each of the admixture of the foregoing embodiment, silica fume, and the admixture of the comparative example II which had only been fired. The reaction products were identified by the powder X-ray diffraction method after two months as described hereinbefore. The results are shown in FIG. 14.

The results of the experiments show the following facts about the sample of the embodiment, the silica fume sample, and the sample of comparative example II.

Sample of Embodiment: As shown in FIG. 12 (a) and FIG. 14 (a), a crystallization reaction such as ettringite formation has taken place simultaneously with the pozzolanic reaction. Further, as seen from FIG. 13 (a), new crystals have developed through recrystallization.

Silica Fume Sample: As shown in FIG. 12 (b) and FIG. 14 (b), only a pozzolanic reaction has taken place. As seen from FIG. 13 (b), no new crystals have developed.

Comparative Example II: As shown in FIG. 12 (c) and FIG. 14 (c), the pozzolanic reaction is dominant. Further, as seen from FIG. 13 (c), no new crystals have developed though changes in configuration are more apparent than with the silica fume sample.

It is inferred from the above that, according to the present invention, initial strength is promoted by the pozzolanic reaction and the crystallization reaction such as ettringite formation taking place simultaneously. It is also inferred that the development of new crystals is effective to reduce drying shrinkage.

Further, splitting tensile strength tests and compressive strength tests were carried out on high strength concrete samples of embodiments II through V and comparative examples VI through XVI. Results of these tests will be described hereinafter.

The splitting tensile strength tests were based on JIS A 1113, in which the samples were placed with no spacing between upper and lower pressure plates of a compression tester (based on JIS B 7733). Load was applied uniformly in a way to avoid shocks, and maximum
) of the compression testing machine before the samples were broken were read.

Three pieces of each sample were prepared for the splitting tensile tests. For the compressive strength tests, three pieces of each sample were prepared for an age of four days, five pieces for an age of seven days, and five pieces for an age of 28 days. However, for each of the embodiment V and comparative example XVI, three pieces each were prepared for the age of seven days and the age of 28 days.

Concrete in Embodiment II 132 kg/m$^3$ of the admixture prepared and refined as above, 530 kg/m$^3$ of ordinary portland cement (JIS A R 5210), 604 kg/m$^3$ of a sand mixture (specific gravity: 2.58, fineness modulus: 3.00) of sea sand off Motojima Island (70%) and crushed sand from Danto (30%) for use as fine aggregate, and 976 kg/m$^3$ of crushed stone from Danto (specific gravity: 2.63) for use as coarse aggregate were dry mixed for 15 seconds, and thereafter mixed with 165 kg/m$^3$ of a high-range water reducing agent (manufactured by Takemoto Yushi K.K.) and water in a 25% water-cement ratio The product was agitated for 30 seconds and then scraped off, and finally agitated for 120 seconds to obtain a concrete sample of embodiment II (No. 18 described later). The coarse aggregate had a maximum particle diameter of 20mm. The sand-coarse aggregate ratio (S/A) which is the proportion of the fine aggregate in the entire aggregate was 38.7%. The dosage of the water reducing agent was 1.2% by weight of the cement. The admixture was added in 20% of the cement. A single-shaft pan type mixer was used for both the dry mixing and agitation.

Concrete in Embodiment III

A sample of embodiment III (No. 19 described later) was prepared in the same way as embodiment II above, except that 99 kg/m$^3$ of the admixture and 5 563 kg/m$^3$ of ordinary portland cement (JIS R 5210) were used, that the admixture was added in the ratio of 15%, and that the dosage of the water reducing agent was 1.0% by weight of the cement.

Concrete in Embodiment IV

A sample of embodiment IV (No. 20 described later) was prepared in the same way as embodiment II above, except that 66 kg/m$^3$ of the admixture and 530 kg/m$^3$ of ordinary portland cement (JIS R 5210) were used, that the admixture was added in the ratio of 10%, and that the dosage of the water reducing agent was 0.95% by weight of the cement.

Concrete in Embodiment V

A sample of embodiment V (No. 25 described later) was prepared in the same way as embodiment III above, except that 54 kg/m$^3$ of the admixture, 306 kg/m$^3$ of ordinary portland cement (JIS R 5210), 791 kg/m$^3$ of a sand mixture (specific gravity: 2.56, fineness modulus 2.03) of crushed sand from Ako (70%) and sea sand off Motojima Island (30%) acting as fine aggregate, and 914 kg/m$^3$ of crushed stone from Ako (specific gravity: 2.63) acting as coarse aggregate were used, that the unit quantity of water was 180 kg/m$^3$, that the water-cement ratio was 50%, that the fine aggregate ratio (S/A) was 46.4%, and that the dosage of the water reducing agent was 1.45% by weight of the cement.

Concrete of Comparative Example VI

A sample of comparative example VI (No. 11 described later) was prepared in the same way as embodiment III above, except that 99 kg/m$^3$ of silica fume was used as an admixture and that the dosage of the water reducing agent was 1.8% by weight of the cement.

Concrete of Comparative Example VII

A sample of comparative example VII (No. 12 described later) was prepared in the same way as embodiment III above, except that 116 kg/m$^3$ of silica fume was used as an admixture, that 659 kg/m$^3$ of ordinary portland cement (JIS R 5210), 537 kg/m$^3$ of the fine aggregate, and 155 kg/m$^3$ of unit quantity of water were used, that the water-cement ratio was 20%, that the fine aggregate ratio (S/A) was 35.9%, and that the dosage of the water reducing agent was 2.0% by weight of the cement.

Concrete of Comparative Example VIII

A sample of comparative example VIII (No. 13 described later) was prepared in the same way as embodiment VII above, except that crushed stone from Ako (specific gravity: 2.63) was used as coarse aggregate.

Concrete of Comparative Example IX

A sample of comparative example IX (No. 14 described later) was prepared in the same way as embodiment VII above, except that 586 kg/m³ of the fine aggregate and 927 kg/m³ of the coarse aggregate were used, that the coarse aggregate had a maximum particle diameter of 15mm, and that the fine aggregate ratio (S/A) was 39.2%.

Concrete of Comparative Example X

A sample of comparative example X (No. 15 described later) was prepared in the same way as embodiment VII above, except that 620 kg/m³ of cement, 632 kg/m³ of the fine aggregate, 878 kg/m³ of the coarse aggregate and 155 kg/m³ of silica fume were used, that the coarse aggregate had a maximum particle diameter of 10mm, that the admixture was added in the ratio of 20%, that the fine aggregate ratio (S/A) was 42.3%, and that the dosage of the water reducing agent was 2.7% by weight of the cement.

Concrete of Comparative Example XI

A sample of comparative example XI (No. 16 described later) was prepared in the same way as embodiment X above, except that 659 kg/m³ of cement and 116 kg/m³ of silica fume were used, that the admixture was added in the ratio of 15%, and that the dosage of the water reducing agent was 2.5% by weight of the cement.

Concrete of Comparative Example XII

A sample of comparative example XII (No. 17 described later) was prepared in the same way as embodiment XI above, except that the admixture was added in the ratio of 10%, and that the dosage of the water reducing agent was 2.2% by weight of the cement.

Concrete of Comparative Example XIII

A sample of comparative example XIII (No. 21 described later) was prepared in the same way as embodiment III above, except that coated metakaolin was used as an admixture, and that the dosage of the water reducing agent was 1.1% by weight of the cement.

Concrete of Comparative Example XIV

A sample of comparative example XIV (No. 22 described later) was prepared in the same way as embodiment III above, except that silica fume and the admixture of the embodiment were mixed in the ratio of 10% each as admixtures, and that the dosage of the water reducing agent was 1.05% by weight of the cement.

Concrete of Comparative Example XV

A sample of comparative example XV (No. 23 described later) was prepared in the same way as embodiment III above, except that 135 kg/m³ of silica fume was used as an admixture, that 763 kg/m³ of ordinary portland cement (JIS R 5210), 456 kg/m³ of the fine aggregate, 927 kg/m³ of the coarse aggregate, and 159 kg/m³ of unit quantity of water were used, that the water-cement ratio was 17.7%, that the fine aggregate ratio (S/A) was 31.9%, and that the dosage of the water reducing agent was 4.0% by weight of the cement.

Concrete of Comparative Example XVI

A sample of comparative example XVI (No. 24 described later) was prepared in the same way as embodiment III above, except that the admixture was not used, that 360 kg/m³ of ordinary portland cement (JIS R 5210), 791 kg/m³ of a sand mixture (specific gravity: 2.56, fineness modulus: 2.03) of crushed sand from Ako (70%) and sea sand off Motojima Island (30%) acting as fine aggregate, and 914 kg/m³ of crushed stone from Ako (specific gravity: 2.63) acting as coarse aggregate were used, that the unit quantity of water was 180 kg/m³, that the water-cement ratio was 50%, that the fine aggregate ratio (S/A) was 46.4%, and that the dosage of the water reducing agent was 1.1% by weight of the cement.

Splitting tensile strength tests were carried out on the high strength concrete samples at the age of four weeks of the above embodiments II through V and comparative examples VI through XVI. Table 9 shows the test results.

TABLE 9

| Sample | S.T. Strength (kfg/cm²) measur. | average | Spc. Gravity measur. | average |
|---|---|---|---|---|
| 11 | 57.8 | | 2.417 | |
|  | 35.1 | 49.2 | 2.455 | 2.437 |
|  | 54.6 | σ = 10.0 | 2.439 | |
| 12 | 42.9 | | 2.459 | |
|  | 48.9 | 45.9 | 2.442 | 2.446 |
|  | 45.8 | σ = 2.4 | 2.438 | |
| 13 | 28.7 | | 2.443 | |
|  | 54.4 | 50.4 | 2.422 | 2.438 |
|  | 58.3 | σ = 8.5 | 2.449 | |
| 14 | 35.4 | | 2.452 | |
|  | 43.1 | 38.4 | 2.453 | 2.455 |
|  | 36.7 | σ = 3.4 | 2.461 | |
| 15 | 36.8 | | 2.415 | |
|  | 37.4 | 41.7 | 2.425 | 2.420 |
|  | 50.8 | σ = 6.5 | 2.420 | |
| 16 | 51.8 | | 2.429 | |
|  | 48.1 | 47.8 | 2.447 | 2.432 |
|  | 43.3 | σ = 3.5 | 2.419 | |
| 17 | 53.9 | | 2.452 | |
|  | 56.2 | 51.5 | 2.452 | 2.450 |
|  | 44.5 | σ = 5.1 | 2.447 | |
| 18 | *32.0 | 74.8 | 2.433 | |
|  | 75.0 | *60.5 | 2.457 | 2.444 |
|  | 74.6 | σ = 20.2 | 2.441 | |
| 19 | 66.9 | | 2.413 | |
|  | 74.6 | 62.8 | 2.426 | 2.417 |
|  | 47.0 | σ = 11.6 | 2.412 | |
| 20 | 69.6 | | 2.452 | |
|  | 57.4 | 55.9 | 2.401 | 2.431 |
|  | 40.8 | σ = 11.8 | 2.440 | |
| 21 | 72.9 | | 2.460 | |
|  | 72.6 | 67.9 | 2.464 | 2.460 |
|  | 58.3 | σ = 6.8 | 2.455 | |
| 22 | 42.9 | | 2.430 | |
|  | 63.7 | 56.8 | 2.417 | 2.422 |
|  | 63.9 | σ = 9.9 | 2.418 | |
| 23 | 42.1 | | 2.421 | |
|  | 49.5 | 44.0 | 2.441 | 2.428 |
|  | 40.4 | σ = 4.0 | 2.422 | |
| 24 | 32.5 | | 2.421 | |
|  | 33.6 | 31.5 | 2.405 | 2.410 |
|  | 28.4 | σ = 2.2 | 2.406 | |
| 25 | 35.1 | | 2.307 | |
|  | 28.0 | 31.7 | 2.317 | 2.315 |
|  | 31.9 | σ = 2.9 | 2.320 | |

In Table 9, σ shows standard deviations. The sign (*) affixed to a measurement result for embodiment II shows possibility of an error having occurred with the sample or with measurement of the sample. Two average values of splitting tensile strength are shown, one of which takes into account the result which may be in error and the other does not.

Figure 15:
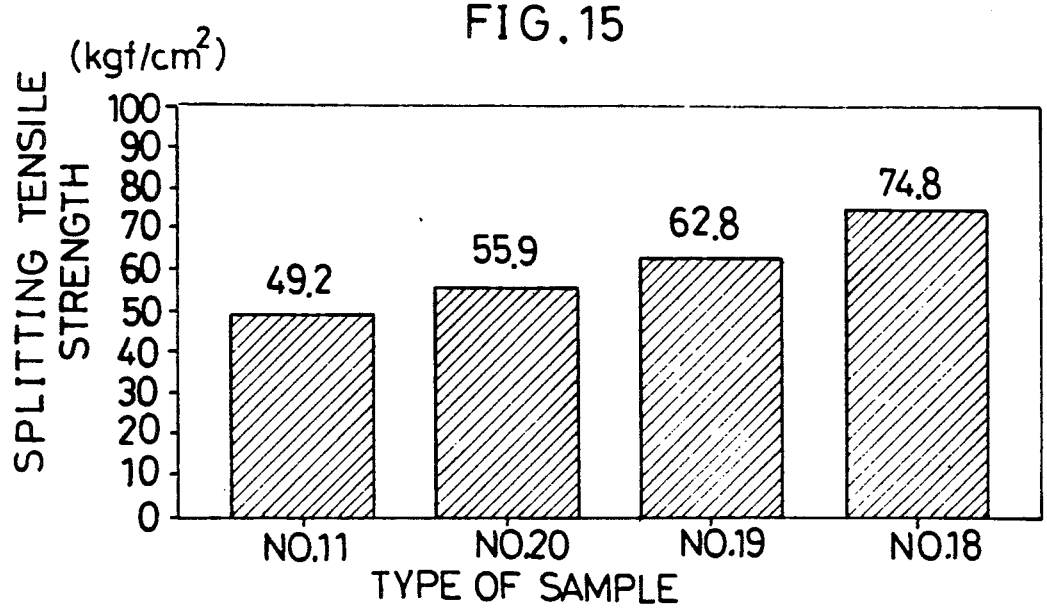
FIG. 15 is a graph comparing splitting tensile strength.

For clarity, FIG. 15 shows a graph comparing the splitting tensile strength between comparative example VI and embodiments II through IV in which the water-cement ratio is 25%.

Splitting tensile strength tests were carried out on the high strength concrete samples of the foregoing embodiments II through V and comparative examples VI through XVI. Table 10 shows the test results.

TABLE 10

| | Compressive Strength (kgf/cm$^2$) | | | | | |
|---|---|---|---|---|---|---|
| | 4 days of age | | 7 days of age | | 28 days of age | |
| Sample | measur. | average | measur. | average | measure | average |
| 11 | 867 | | 1076 | | 1303 | |
|  | 840 | | 940 | | 1185 | |
|  | 799 | 835 | 915 | 938 | 1255 | 1298 |
|  | — | $\sigma = 28.0$ | 949 | 966 | 1299 | 1275 |
|  | — | | 949 | $\sigma = 56.5$ | 1334 | $\sigma = 51.5$ |
| 12 | 896 | | 1036 | | 1404 | |
|  | 923 | | 978 | 1350 | | |
|  | 785 | 868 | 1038 | 1018 | 1359 | 1386 |
|  | — | $\sigma = 59.7$ | 1039 | $\sigma = 24.7$ | 1432 | 1349 |
|  | — | | 1001 | | 1198 | $\sigma = 81.1$ |
| 13 | 784 | | 845 | | 1163 | |
|  | 772 | | 886 | | 1114 | |
|  | 779 | 778 | 873 | 886 | 1165 | 1162 |
|  | — | $\sigma = 4.9$ | 893 | 878 | 1151 | 1152 |
|  | — | | 893 | $\sigma = 18.0$ | 1169 | $\sigma = 20.0$ |
| 14 | 892 | | 1026 | | 1385 | |
|  | 906 | | 1056 | | 1389 | |
|  | 901 | 900 | 1048 | 1047 | 1397 | 1390 |
|  | — | $\sigma = 5.8$ | 988 | 1035 | 1390 | 1374 |
|  | — | | 1059 | $\sigma = 26.4$ | 1309 | $\sigma = 32.8$ |
|  | 847 | | 1080 | | 1378 | |
| 15 | 848 | | 1058 | | 1273 | |
|  | 884 | 860 | 1078 | 1063 | 1240 | 1305 |
|  | — | $\sigma = 17.2$ | 993 | 1049 | 1343 | $\sigma = 49.3$ |
|  | — | | 1034 | $\sigma = 32.4$ | 1291 | |
| 16 | 902 | | 1035 | | 1370 | |
|  | 906 | | 1090 | | 1355 | |
|  | 909 | 906 | 1033 | 1049 | 1346 | 1352 |
|  | — | $\sigma = 2.9$ | 1019 | $\sigma = 25.9$ | 1337 | 1307 |
|  | — | | 1067 | | 1129 | $\sigma = 89.7$ |
| 17 | 856 | | 1092 | | 1249 | |
|  | 890 | | 1126 | | 1291 | |
|  | 870 | 872 | 1099 | 1090 | 1182 | 1246 |
|  | — | $\sigma = 14.0$ | 1087 | 1097 | 1194 | $\sigma = 51.9$ |
|  | — | | 1081 | $\sigma = 15.7$ | 1314 | |
| 18 | 897 | | 1098 | | 1267 | |
|  | 929 | | 1110 | | 1250 | |
|  | 888 | 905 | 1133 | 1097 | 1324 | 1260 |
|  | — | $\sigma = 17.6$ | 1086 1104 | 1277 | 1273 | |
|  | — | | 1095 | $\sigma = 16.2$ | 1249 | $\sigma = 27.6$ |
| 19 | 866 | | 1047 | | 1216 | |
|  | 896 | | 1117 | | 1201 | |
|  | 907 | 890 | 1105 | 1083 | 1286 | 1241 |
|  | — | $\sigma = 17.3$ | 1077 | $\sigma = 25.4$ | 1188 | $\sigma = 50.6$ |
|  | — | | 1067 | | 1317 | |
|  | 875 | | 1033 | | 1235 | |
| 20 | 873 | | 1065 | | 1206 | 1222 |
|  | 908 | 885 | 1028 | 1048 | 1239 | 1234 |
|  | — | $\sigma = 16.0$ | 1040 | $\sigma = 18.8$ | 1278 | $\sigma = 26.1$ |
|  | — | | 1076 | | 1211 | |
| 21 | 820 | | 942 | | 1159 | |
|  | 817 | | 943 | | 1191 | |
|  | 802 | 813 | 867 | 923 | 1229 | 1205 |
|  | — | $\sigma = 7.9$ | 940 | $\sigma = 28.9$ | 1238 | $\sigma = 28.3$ |
|  | — | | 923 | | 1210 | |
| 22 | 828 | | 1020 | | 1178 | |
|  | 791 | | 1015 | | 1062 | |
|  | 836 | 818 | 1035 | 1029 | 1264 | 1214 |
|  | — | $\sigma = 19.6$ | 1047 | $\sigma = 11.3$ | 1205 | 1183 |
|  | — | | 1030 | | 1208 | $\sigma = 67.0$ |
| 23 | 865 | | 1020 | | 988 | |
|  | 844 | | 1044 | | 1342 | |
|  | 878 | 862 | 1035 | 1040 | 1348 | 1313 |
|  | — | $\sigma = 14.0$ | 1038 | $\sigma = 14.0$ | 1222 | 1248 |
|  | — | | 1063 | | 1341 | $\sigma = 138$ |
| 24 | 292 | | 358 | | 418 | |
|  | 285 | 289 | 348 | 350 | 452 | 441 |
|  | 290 | $\sigma = 2.9$ | 3245 | $\sigma = 5.6$ | 452 | $\sigma = 16.0$ |
| 25 | 295 | | 371 | | 526 | |
|  | 270 | 282 | 381 | 372 | 547 | 545 |

TABLE 10-continued

| Sample | Compressive Strength (kgf/cm²) | | | | | |
|---|---|---|---|---|---|---|
| | 4 days of age | | 7 days of age | | 28 days of age | |
| | measur. | average | measur. | average | measure | average |
| | 281 | σ = 10.2 | 363 | σ = 117.4 | 563 | σ = 15.1 |

In Table 10, σ shows standard deviations. The underlined measurement results show possibility of errors having occurred with the samples or with the measurement of the samples. Two average values are shown, one of which takes into account the result which may be in error and the other does not, the former being underlined.

It is clear from the results of the splitting tensile tests and compressive strength tests that, where the water-cement ratio is the same, the samples of embodiments II through V have improved splitting tensile strength and compressive strength, while having excellent fluidity, over the comparative examples.

More particularly, where the water-cement ratio is reduced to 30% or below in order to enhance strength, the product cannot be kneaded without mixing an admixture thereinto. Where the conventional silica fume was mixed as the admixture, the splitting tensile strength and compressive strength were insufficient. An improvement in this aspect is made possible by using the admixture according to the present invention.

A very high strength and high quality may be realized with Precast Concrete poles, beams, piles, using the admixture according to the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cement composition comprising 100 parts by weight cement, 107.28 to 258.5 parts by weight fine aggregates; 0.95 to 1.85 parts by weight of a water reducing agent; 29.31 to 58.82 parts by weight water and 5 to 30% of an admixture by weight of the cement, wherein the admixture is prepared by calcining at 630° to 870° C. at least one substance selected from the group consisting of natural kaolin, halloysite and synthetic kaolin, and effecting classification so that amorphous portions of silica/alumina having a mixture ratio of 1.1 to 1.3 form main components, with all particles having diameters up to 8 μm and an average diameter of 0.5 to 2 μm, and a specific gravity ranging from 2.45 to 2.55.

2. In a cement composition including cement, water, fine aggregates and a water reducing agent, the improvement for making a wet cement exhibit low viscosity and long stability, which forms a strong dried cement exhibiting little shrinkage, comprising addition of 5 to 30%, compared to the weight of the cement, of a particulate material produced by the process of calcining at least one member of the group consisting of natural kaolin, halloysite and synthetic kaolin at a temperature range of about 630° to 870° C., thereby forming amorphous particles having a silica to alumina ratio of 1.1 to 1.3 and classifying the particles to obtain the particulate material having a diameter less than 8 μm, an average diameter of about 0.5 to 2 μm, and a specific gravity of about 2.45 to 2.55.

3. A cement composition according to claim 2, wherein the particulate material is 10 to 20%, compared to the weight of the cement.

* * * * *